United States Patent [19]

Kidaloski et al.

[11] Patent Number: 5,386,676
[45] Date of Patent: Feb. 7, 1995

[54] ADJUSTABLE PACKED PANEL JOINT END COVER

[75] Inventors: Raymond G. Kidaloski, Canal Fulton; Roger A. Detzel, Norton; R. Jeffrey Warrick, Jackson Township, Stark County, all of Ohio

[73] Assignee: The Babcock & Wilcox Company, New Orleans, La.

[21] Appl. No.: 44,994

[22] Filed: Apr. 7, 1993

[51] Int. Cl.⁶ .................................................. E04C 3/00
[52] U.S. Cl. .................................... 52/582.1; 403/28; 52/223.6
[58] Field of Search .................. 403/269, 270, 28; 52/223.6, 223.7, 578, 249, 582.1; 165/81, 135

[56] References Cited

U.S. PATENT DOCUMENTS

| 4,237,668 | 12/1980 | Mathusima et al. | 52/249 |
| 4,582,094 | 4/1986 | Stausebach | 138/147 |

FOREIGN PATENT DOCUMENTS

| 33290 | 8/1981 | European Pat. Off. | 52/582.1 |
| 658886 | 4/1938 | Germany | 52/582.1 |
| 4203692 | 7/1992 | Japan | 165/135 |

Primary Examiner—Thomas E. Denion
Attorney, Agent, or Firm—Robert J. Edwards; Eric Marich

[57] ABSTRACT

Internally insulated or packed panels house a thermal structure such as a heat recovery steam generator (HRSG). In a first embodiment, each packed panel has a cold pressure casing with an insulating layer covered by a liner plate. Welded collar studs are fixed to the cold pressure casing to secure the liner plate over the insulating layer. Small, movable end covers are provided at the edges of each packed panel to provide an adjustable panel joint. End covers of adjacent panels are in compression contact when an externally applied weld is provided between the cold pressure casings of adjacent packed panels. Each end cover is movable about each packed panel by means of oversized or slotted holes in the liner plate and end covers that receive each collar stud. Benefits are faster field assembly and allowance for thermal growth while preventing gaps and their associated hot spots from forming at the panel joints. A second embodiment employs a larger end cover in place of a smaller end cover and liner plate.

11 Claims, 6 Drawing Sheets

ADJUSTABLE PACKED PANEL JOINT END COVER

FIELD AND BACKGROUND OF THE INVENTION

The present invention relates in general to internally insulated panels and, in particular, to an adjustable joint for internally insulated panels particularly suitable for high temperature applications.

It is common in the steam generator field to use a box-type paneled structure comprising casing or plate material supported by external structural frame members to form internally insulated or packed panels for a heat recovery steam generator, abbreviated HRSG. As used herein, the term HRSG refers to a thermal structure used to extract the heat energy from turbine exhaust gas and use the energy to produce steam, typically for electric power generation.

FIG. 1 shows a cutaway illustration of such an HRSG 1. The HRSG 1 is provided with high temperature turbine exhaust gas 2, which can easily exceed 1000° F., through an inlet flue 3. The exhaust gas 2 passes across an arrangement of heating surface and other components within the HRSG 1. The heating surface could be oriented substantially vertically, such as when a natural circulation design is employed, or substantially horizontally, such as when a forced circulation design is employed, or at some inclined angle to the horizontal as required. A box-type external structure or housing made of internally insulated side wall panels 4 partially surrounds this heating surface. To protect the insulation, an internal steel liner supported from the cold casing by nuts and welded studs is required. This configuration of liner, insulation, and casing is called a packed panel. Personnel protection considerations require sufficient insulation on these side wall panels 4 to achieve an external surface temperature of approximately 130° F., eliminating the need to protect personnel in close proximity with the HRSG 1. Thermal expansions of the cold casing and support structure are also minimized by this configuration.

As shown in FIG. 1, a typical arrangement of components within the HRSG 1 might comprise: high pressure superheater 5; high pressure boiler 6; selective catalytic reduction and/or carbon monoxide reduction elements 7; intermediate pressure superheater 8; high pressure economizer 9; intermediate pressure boiler 10; high pressure economizer 11; intermediate pressure economizer 12; low pressure boiler 13; and condenser preheater 14. The gas 2 is then directed through an outlet transition housing 15 into a stack 16 for discharge into the atmosphere, by which point the exhaust gas has been reduced in temperature to approximately 200° F. Located above the HRSG 1 heating surface and other components are a maintenance platform 17, structural steel 18, and penthouse 19, arranged around high, intermediate, and low pressure drums 6A, 10A, and 13A, respectively, and a deaerator 20.

Previous liner designs used in packed panel construction for such HRSG's require extensive field assembly and have been known to result in large internal gaps at the junctions between the packed panels after a period of time. These gaps produce hot spots on the outside casing at these locations.

FIG. 2 illustrates a known packed panel 30 comprising a cold pressure casing 32 which acts as the pressure boundary. Insulation 34 between a liner 36 and the cold pressure casing 32 drastically reduces the temperature of the turbine exhaust gas 2 passing along liner 36 through the thickness of packed panel 30. Collar studs 38 are welded to an inner surface of the cold pressure casing 32 and secure the liner 36 thereto by means of nuts 40 attached to the collar studs 38.

When constructing the box-type structure of packed panels 30 housing a heat recovery steam generator, it is common to have a junction or joint 42 between adjacent packed panels 30 as is shown in FIG. 2. The joint 42 used between adjacent insulated panels 30 requires extensive field assembly. Joint insulation 44 is required to be inserted between adjacent packed panels 30 and a joint liner 46 is provided to cover the joint insulation 44 and to connect the adjacent panels 30. A field weld 48 is provided at the cold pressure casing 32 between adjacent panels 30 to stabilize the joint 42.

Temporary bent liner plate corners have been used for shipping these packed panels. However, these corners had to be removed during field erection and were discarded. At the packed panel junctions, narrow, flat pieces of loose liner plate were field installed during erection to function as lap plates which protected the underlying insulation.

Illustrated in FIG. 3 is another known method for providing a joint 42 between adjacent packed panels 30, wherein permanent liner plates 36 are provided and bent at right angles to form a liner end 50. By bending the liner plate 36 to form a liner end 50, the adjacent panels 30 are allowed to be aligned adjacent to each other. The initial gap size between the liner ends 50 was a function of actual field fit up. However, after several boiler operating thermal cycles, the liner end 50 on one packed panel 30 assumes a thermally stable position relative to the insulation 34 and the liner end 50 of an adjacent packed panel 30. As shown in FIG. 4, each packed panel 30 has been known to undergo thermal expansion in direction 80 as shown. Subsequent thermal cycles result in compressed insulation 34, creating unpredictably sized gaps 52 between the liner ends 50 and a hot spot on the cold pressure casing 32 at that location.

Presently, there is no known device or method for providing a joint or junction for these packed panels used in heat recovery steam generators which requires minimum field assembly while eliminating the internal gaps and consequent hot spots formed between the packed panels during operation.

SUMMARY OF THE INVENTION

The present invention provides a packed panel and a packed panel joint construction for internally insulated or packed panels used to house heat recovery steam generators. The present invention reduces the amount of field labor by requiring only minimal field assembly. The present invention also eliminates internal gaps that are commonly formed between these packed panels after the heat recovery steam generator has experienced several heat up and cool down operating cycles, thereby reducing the occurrence of hot spots on the cold side of the pressure casing at the panel junctions.

The present invention provides for using a packed panel having a layer of insulation between the cold pressure casing and the liner plate which extends inwardly from the cold pressure casing. An end of the insulation extends beyond at least one edge of the cold pressure casing on each packed panel. Small pieces of bent liner plate are provided as separate end covers and are used in conjunction with existing packed panel components for each panel over the extended insulation layer and are loosely attached to the liner. The insulation and separate end covers extend beyond the edge of the cold pressure casing at the field joint forming a tight interference fit at field assembly. An adjustable joint is thus formed by aligning adjacent panels, compressing the respective end covers, and then providing a weld between panels at the adjacent cold casing.

The present invention is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
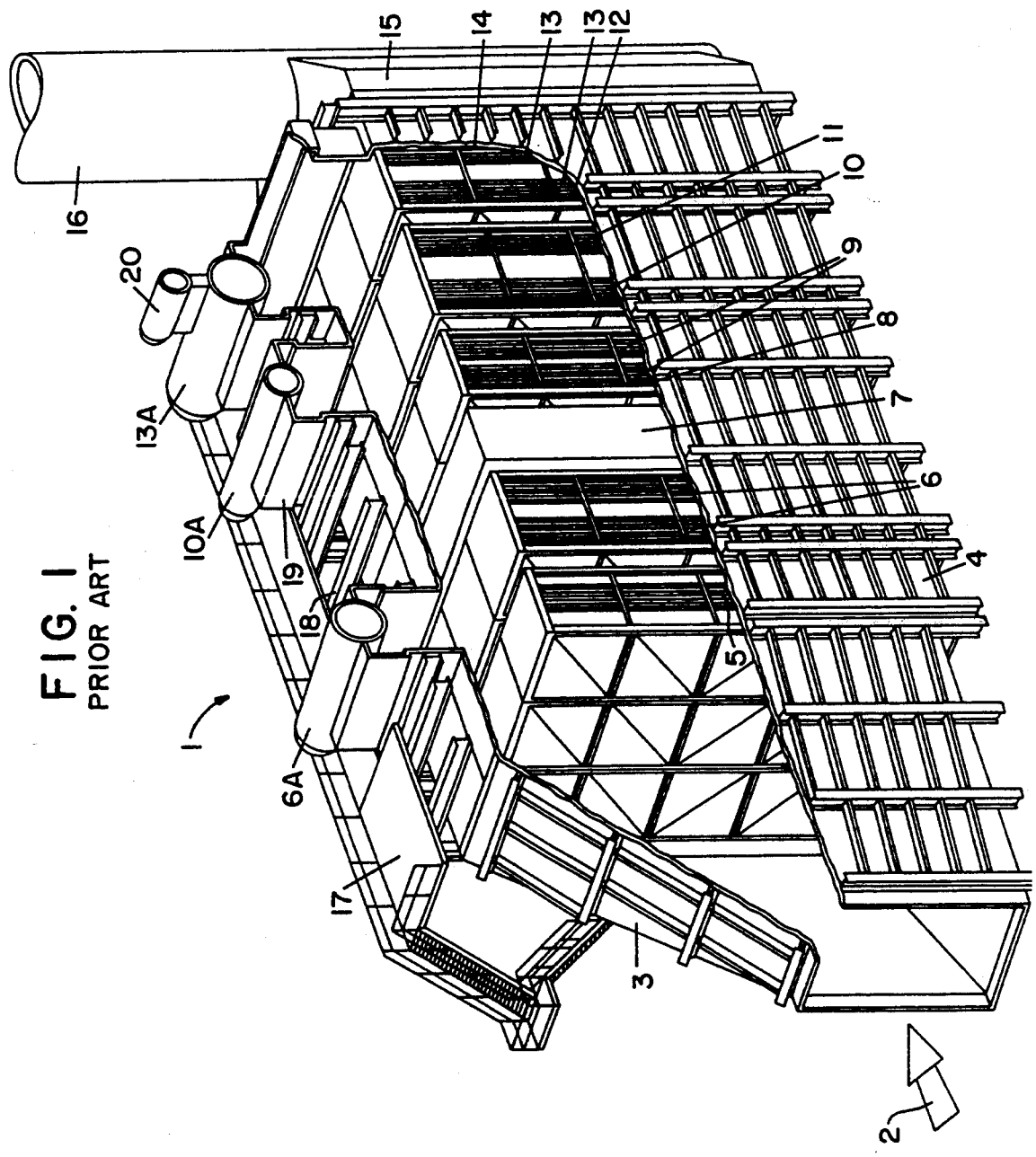
FIG. 1 is a cutaway illustration of a typical heat recovery steam generator.
Figure 2:
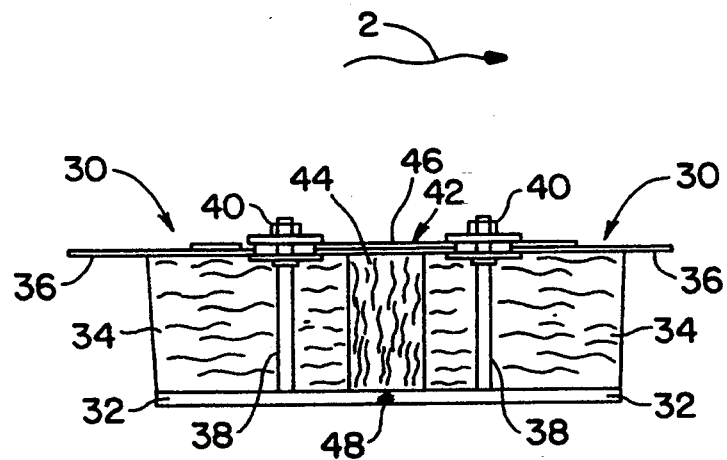
FIG. 2 is a cross-sectional view of a known joint for packed panels.
Figure 3:
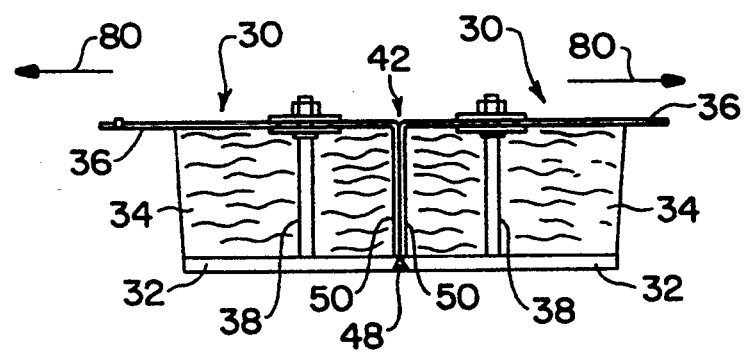
FIG. 3 is a cross-sectional view of a second known joint for packed panels.
Figure 4:
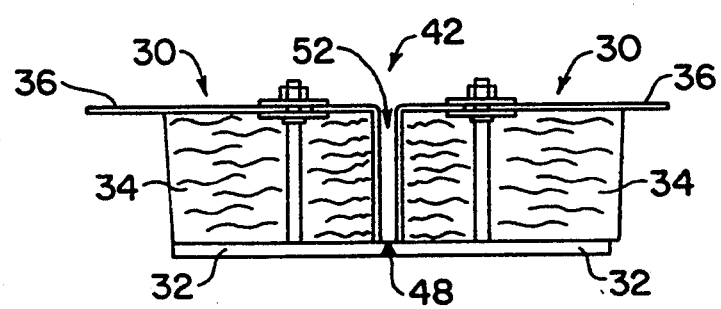
FIG. 4 is a cross-sectional view of the joint of FIG. 3 after several thermal cycles.
Figure 5:
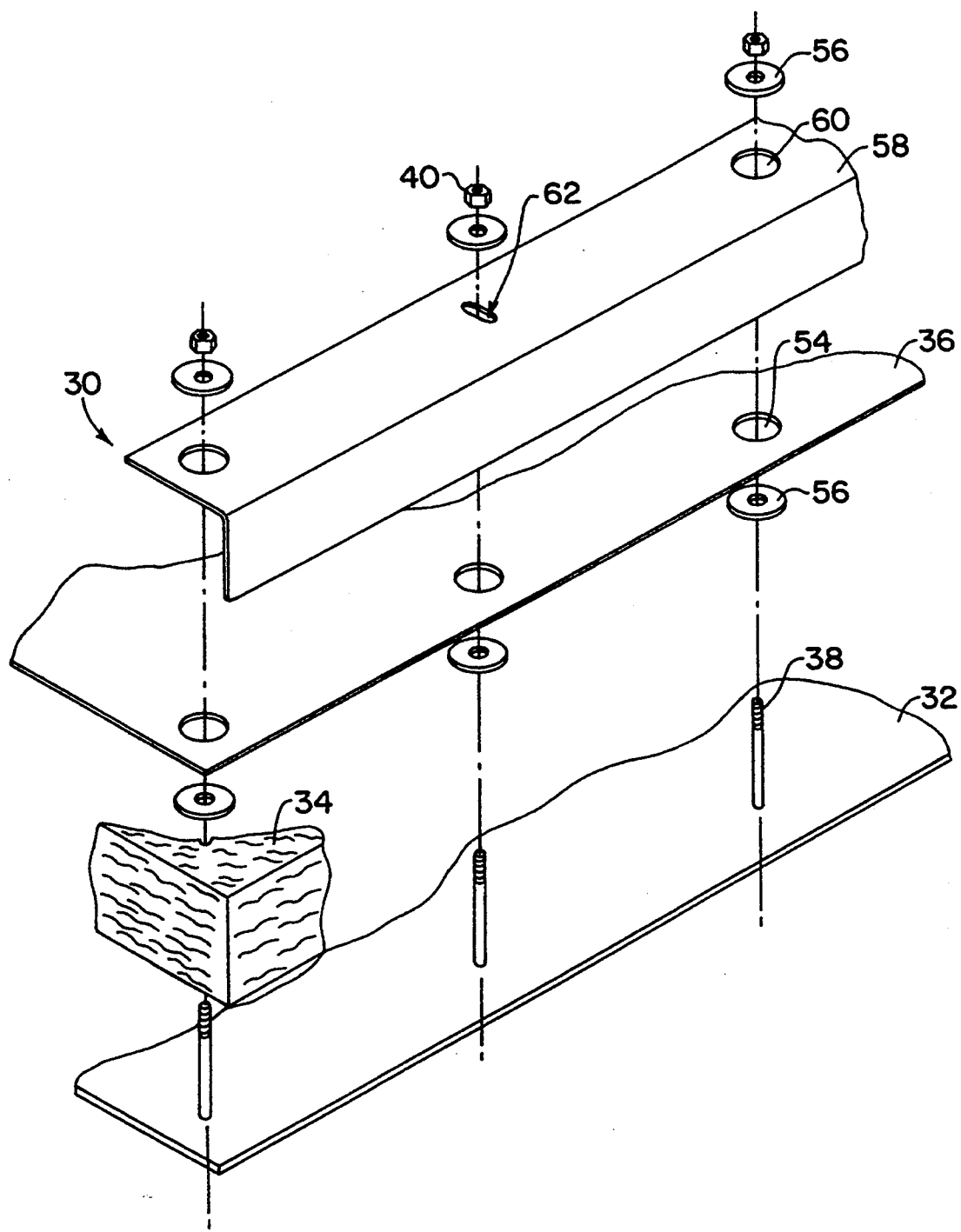
FIG. 5 is a partial exploded view of an end of a packed panel constructed according to the present invention.
Figure 6:
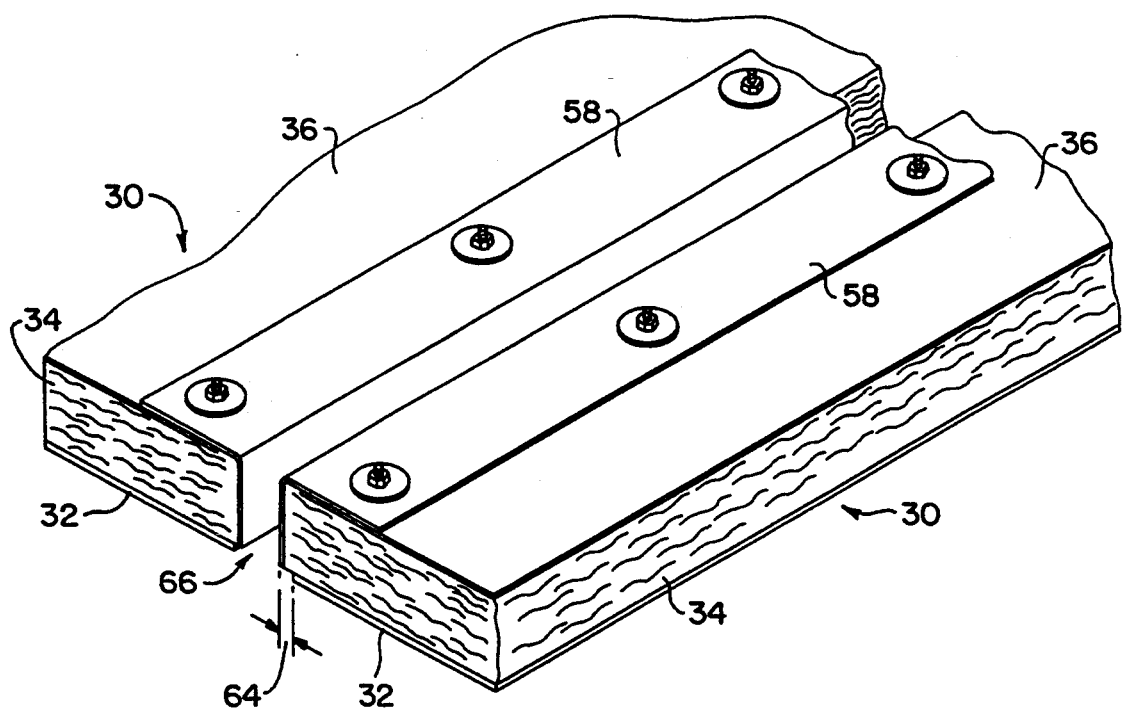
FIG. 6 is a partial perspective view of a pair of adjacent, packed panels constructed according to the present invention, before final assembly.
Figure 7:
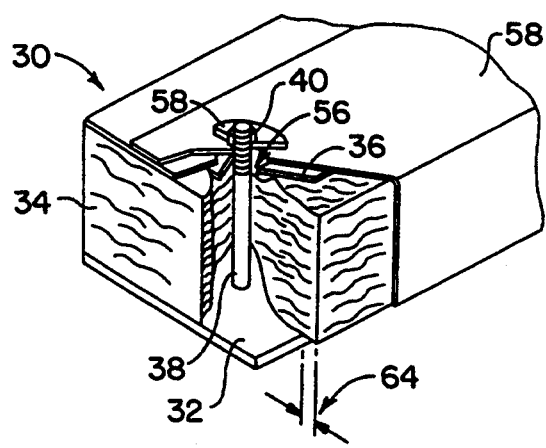
FIG. 7 is a cutaway perspective view of one of the panels of FIG. 6.
Figure 8:
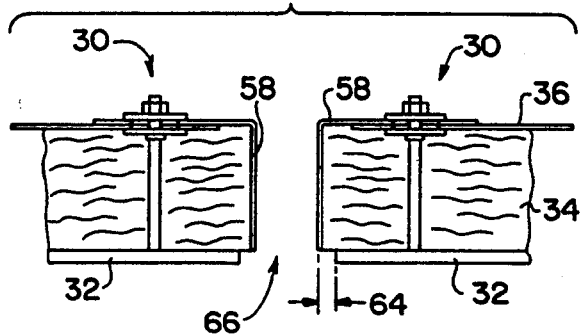
FIG. 8 is a cross-sectional view of the pair of packed panels of FIG. 6, before final assembly.
Figure 9:
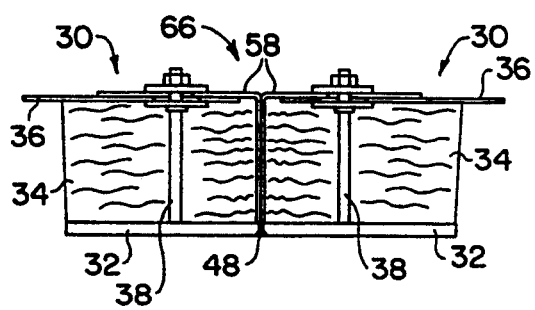
FIG. 9 is a cross-sectional view of the pair of packed panels of FIG. 6, after final assembly.
Figure 10:
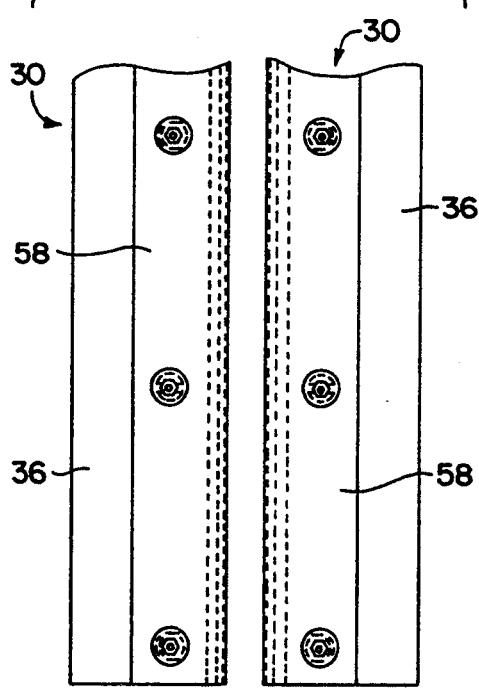
FIG. 10 is a partial top view of the pair of packed panels of FIG. 8.
Figure 11:
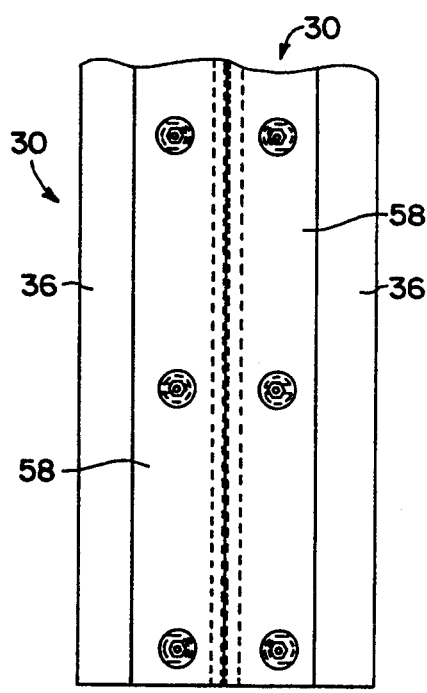
FIG. 11 is a partial top view of the pair of packed panels of FIG. 9.

Referring to the drawings generally, wherein like numerals designate the same or similar elements throughout the several drawings, and to FIGS. 5, 6, and 7 in particular, there is shown a packed panel 30 according to the teachings of the present invention. The packed panel 30 comprises an outer cold pressure casing 32 having a plurality of collar studs 38 welded thereto. The collar studs 38 extend through the insulating layer 34 which is secured between the cold pressure casing 32 and the liner plate 36. Liner holes 54 are provided on the liner plate 36 for receiving each collar stud 38. The liner holes 54 are oversized, compared to the diameter of the collar studs 38, to permit thermal growth. Washers 56, having an outside diameter larger than the diameter of the liner holes 54, are positioned over the collar studs 38 between the insulating layer 34 and the liner plate 36.

An important aspect of the present invention is end cover 58, which is bent at an angle and positioned over the liner plate 36 and insulating layer 34 on the cold pressure casing 32 by placing the end cover 58 over the collar studs 38 extending through the liner plate 36. For packed panels 30 forming a flat wall surface, the end cover 58 would typically be bent at a right angle so that each end cover 58 on one packed panel 30 would completely contact an end cover 58 of an adjacent panel. However, it is understood that other angles could be employed, particularly at areas where packed panels 30 meet at a corner, such as at a transition from one section to another, so that complete contact between adjacent panels is maintained. One location where such a non-right angle would be employed is the transition from the inlet flue 30 to the main portion of the HRSG 1 defined by the packed panels 30. End cover 58 has a plurality of end cover holes 60, which can also be slotted holes as shown at 62, that have a minimum dimension greater than the diameter of the collar studs 38 to permit movement of the end cover 58 about the collar studs 38 and accommodate thermal expansion and contraction of the packed panel 30 during operation. Washers 56, again having an outside diameter larger than the diameter of the end cover holes 60 or slots 62, can also be provided on the end cover 58 over each collar stud 38. A securing means such as nut 40 secures washer 56 and end cover 58 to the collar studs 38.

As shown in FIGS. 6 and 7, at least one edge of each packed panel 30 has an end cover 58 which extends over the liner plate 36 and the insulating layer 34 and bends towards the cold pressure casing 32. Each packed panel 30 is fabricated prior to assembly such that the insulating layer 34 extends beyond at least one edge of the cold pressure casing 32. Thus, the end cover 58 when fitted over the liner plate 36 and the insulating layer 34 will extend past the edge of the cold pressure casing 32 forming an extension 64 at a junction or joint 66 between adjacent packed panels 30.

FIGS. 8, 9, 10, and 11 show another important aspect of the present invention wherein, upon assembly, the insulating layer 34 at the edge of each packed panel 30 is compressed such that the extension 64 no longer exists and the end covers 58 align with the edges of their associated cold pressure casings 32. An externally applied field weld 48 completes the joint and seals the structure.

FIGS. 5-11 illustrate that each end cover 58 can be configured so as to comprise only a small, bent plate for covering an edge of each packed panel 30. This configuration of the end cover 58 permits rapid and expedient field assembly.

Figure 12:
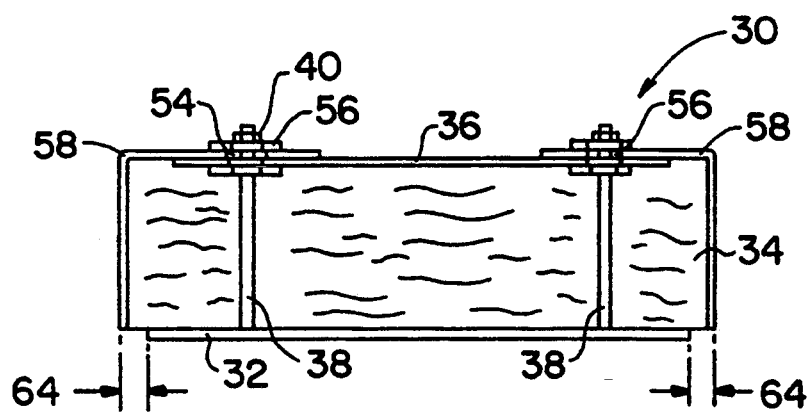
FIG. 12 is a cross-sectional view of one embodiment of a packed panel according to the present invention, before final assembly with an adjacent packed panel.
Figure 13:
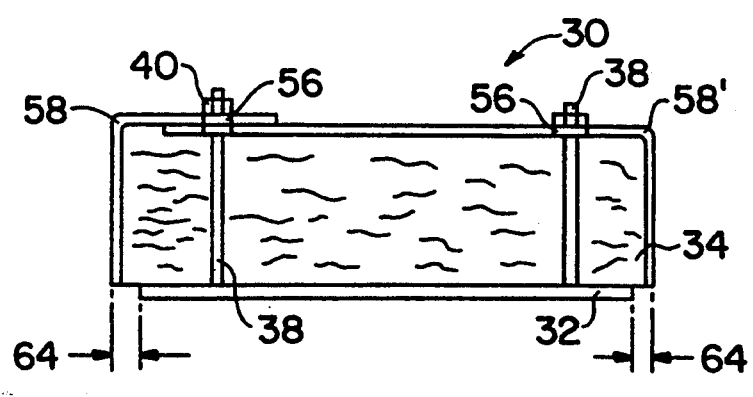
FIG. 13 is a cross-sectional view of another embodiment of a packed panel according to the present invention, before final assembly with an adjacent packed panel.

FIGS. 12 and 13 illustrate a cross-sectional view of two embodiments of a packed panel 30 according to the teachings of the present invention. FIG. 12 shows a single packed panel 30, before assembly, wherein two small, bent plate end covers 58 are employed on opposite edges of the packed panel 30. In this case, a conventional liner plate 36 is employed and a total of three separate elements (two end covers 58 and one liner plate 36) are required to secure the insulating layer 34 to the cold pressure casing 32. FIG. 13 shows an alternative embodiment using a single, small end cover 58 and a large end cover 58', the latter of which would take the place of both the second small end cover 58 and the liner plate 36. Suitable oversized 60 or slotted 62 openings would be provided in the small end cover 58 and the large end cover 58' as needed to allow for thermal expansion and differential growth between the cold pressure casing 32 and the small and large end covers 58, 58', respectively. Again, extensions 64 would again be placed on opposite edges of the packed panel 30 to provide an interference fit at final field assembly with other packed panels 30.

The present invention thus eliminates the installation of small pieces of insulation 44 to form the junction or joint 42 between the packed panels 30 of the prior art. The present invention also eliminates the intensive field labor required with the known packed panels 30 by allowing each packed panel 30 to be pre-configured in a controlled shop environment.

The adjustable and movable end covers 58 for each packed panel 30 accommodate differential growth between the cold pressure casing 32 and the hot liner plates 36. The present invention permits unrestrained thermal growth of the liner plates 36 relative to its own cold pressure casing 32 and to adjacent packed panels 30 while prohibiting axial compressive stresses in the liner plates 36 during operation of the heat recovery steam generator. The use of the small end cover 58 and large end cover 58' reduces the number of components needed to protect the insulating layer 34 that must be shop assembled from three to two, resulting in further savings.

The extension of insulating layer 34 used by the present invention at the edge of the packed panels permits an interference fit at each panel junction 66. The insulating layer 34 remains compact and unaffected by subsequent thermal growth of the liner plates 36 and the like when the heat recovery steam generator is in use.

While specific embodiments of the invention have been shown and described in detail to illustrate the application of the principles of the invention, it will be understood that the invention may be embodied otherwise without departing from such principles.

We claim:

1. A method for providing an adjustable joint for packed panels forming a housing structure of a heat recovery steam generator, comprising:
   fixing a plurality of collar studs to a cold pressure casing;
   placing an insulating layer over the cold pressure casing, an end of the insulating layer extending beyond at least one edge of the cold pressure casing;
   placing a liner plate over the cold pressure casing such that the liner plate is spaced away from the cold pressure casing by the collar studs and the insulating layer, the collar studs supporting the liner plate above the cold pressure casing, to form a first packed panel;
   securing an end cover bent at an angle to the liner plate and over the insulating layer at the at least one edge of the first packed panel, such that both the insulating layer and the end cover extend beyond the at least one edge of the cold pressure casing to form an extension, and such that the end cover is movably mounted to the liner plate to accommodate thermal growth of the first packed panel;
   repeating the above-listed steps to form a second packed panel;
   positioning the extensions of each packed panel adjacent to each other such that the end cover and the cold pressure casing of the first packed panel is aligned adjacently with the end cover and the cold pressure casing of the second packed panel;
   compressing the extension of the first packed panel against the extension of the second packed panel until the cold pressure casings of each packed panel are adjacent to each other; and
   welding the cold casings of these adjoining packed panels at the aligned end covers to form an adjustable joint between the packed panels.

2. The method according to claim 1, wherein the liner plate is secured to the collar studs by a securing means.

3. The method according to claim 2, wherein the securing means is a nut.

4. The method according to claim 1, wherein the weld is provided only at the cold casing from the outside of the housing structure where the end covers of adjacently-positioned packed panels meet.

5. An adjustable joint for packed panels forming a housing for a thermal structure, comprising:
   first and second cold pressure casings for housing the thermal structure;
   an insulating layer provided on each cold pressure casing and extending beyond at least one edge of each cold pressure casing;
   a liner plate seated on each insulating layer;
   means for attaching each liner plate to its associated cold pressure casing to form a first and a second packed panel;
   an end cover movably mounted to the liner plates on at least one end of each packed panel, each end cover extending from its associated liner plate and bent over its associated insulating layer towards the cold pressure casing at an angle and extending beyond an edge of its associated cold pressure casing; and
   a weld securing the cold pressure casings of the first and second panels to each other when the packed panels are positioned adjacent to each other, each packed panel positioned such that the end cover of the first packed panel contacts and compresses against the end cover of the second packed panel, the welds at the cold pressure casings securing the packed panels to each other.

6. The joint according to claim 5, wherein the end cover is a plate bent over the edge of the insulating layer towards the cold pressure casing forming a substantially right angle with the liner plate and the cold pressure casing of each packed panel.

7. The joint according to claim 5, wherein the means for attaching is a plurality of collar studs fixed to each cold pressure casing, the collar studs extending through a plurality of oversized apertures in each liner plate at an upper end of each collar stud for movably aligning and supporting each liner plate on each cold pressure casing, the collar studs extending through the insulating layer between each liner plate and each cold pressure casing, the upper end of each collar stud for receiving a nut to secure the liner plate thereto, the nut being detachably engagable with the upper end of the collar stud.

8. The joint according to claim 7, wherein each end cover has a plurality of holes thereon for receiving the upper end of each collar stud for fixing each end cover to each liner plate, the holes corresponding in number and alignment with each collar stud, each hole being oversized relative to a diameter of its associated collar stud to permit movement of each end cover over each liner plate.

9. An adjustable joint for packed panels forming a housing for a thermal structure, comprising:

first and second cold pressure casings for housing the thermal structure;

an insulating layer provided on each cold pressure casing and extending beyond at least one edge of each cold pressure casing;

a small end cover movably secured to the cold pressure casing and located on one edge of each packed panel, each small end cover extending over its associated insulating layer towards the cold pressure casing at an angle and extending beyond the one edge of its associated cold pressure casing;

a large end cover movably secured to the cold pressure casing and located on an opposite edge of each packed panel, one end of each large end cover extending over its associated insulating layer and overlapping a portion of the small end cover, the other end extending towards the cold pressure casing at an angle and extending beyond the opposite edge of its associated cold pressure casing;

means for attaching each end cover to its associated cold pressure casing to form a first and a second packed panel; and a weld securing the cold pressure casings of the first and second packed panels to each other when the packed panels are positioned adjacent to each other, each packed panel positioned such that the end cover of the first packed panel contacts and compresses against the end cover of the second packed panel, the welds at the cold pressure casings securing the packed panels to each other.

10. The joint according to claim 9, wherein the means for attaching is a plurality of collar studs fixed to each cold pressure casing, the collar studs extending through a plurality of oversized apertures in each end cover at an upper end of each collar stud for movably aligning and supporting each end cover on each cold pressure casing, the collar studs extending through the insulating layer between each end cover and each cold pressure casing, the upper end of each collar stud for receiving a nut to secure the end covers thereto, the nut being detachably engagable with the upper end of the collar stud.

11. The joint according to claim 10, wherein each end cover has a plurality of holes thereon for receiving the upper end of each collar stud for fixing each end cover to each cold pressure casing, the holes corresponding in number and alignment with each collar stud, each hole being oversized relative to a diameter of its associated collar stud to permit movement of each end cover over its associated cold pressure casing.

* * * * *